United States Patent
Huang et al.

(10) Patent No.: US 12,075,301 B2
(45) Date of Patent: Aug. 27, 2024

(54) CELL RESELECTION FOR NEW RADIO—UNLICENSED

(71) Applicant: Apple Inc., Cupertino, CA (US)

(72) Inventors: Rui Huang, Beijing (CN); Zhibin Yu, Unterhaching BY (DE); Jie Cui, San Jose, CA (US)

(73) Assignee: APPLE INC., Cupertino, CA (US)

( * ) Notice: Subject to any disclaimer, the term of this patent is extended or adjusted under 35 U.S.C. 154(b) by 225 days.

(21) Appl. No.: 17/598,137

(22) PCT Filed: Jul. 15, 2020

(86) PCT No.: PCT/US2020/042057
§ 371 (c)(1),
(2) Date: Sep. 24, 2021

(87) PCT Pub. No.: WO2021/011605
PCT Pub. Date: Jan. 21, 2021

(65) Prior Publication Data
US 2022/0191762 A1 Jun. 16, 2022

Related U.S. Application Data

(60) Provisional application No. 62/874,796, filed on Jul. 16, 2019.

(51) Int. Cl.
*H04W 36/30* (2009.01)
*H04W 48/10* (2009.01)
*H04W 48/16* (2009.01)

(52) U.S. Cl.
CPC .......... *H04W 36/30* (2013.01); *H04W 48/10* (2013.01); *H04W 48/16* (2013.01)

(58) Field of Classification Search
CPC ..... H04W 36/30; H04W 48/10; H04W 48/16; H04W 36/0005; H04W 72/23; H04W 48/18; H04W 36/14; H04W 72/27; H04W 76/19; H04L 12/5691
See application file for complete search history.

(56) References Cited

U.S. PATENT DOCUMENTS

| | | |
|---|---|---|
| 2010/0105380 A1* | 4/2010 | Attar ..................... H04W 48/16 455/434 |
| 2015/0208327 A1 | 7/2015 | Baratam et al. |
| 2018/0139666 A1 | 5/2018 | Ahmavaara et al. |
| 2018/0242223 A1 | 8/2018 | Chendamarai Kannan et al. |

(Continued)

FOREIGN PATENT DOCUMENTS

CN 105917705 A 8/2016

OTHER PUBLICATIONS

On initial access, RRM, mobility and RLM, Ericsson, 3GPP TSG-RAN WG1 Meeting #95, R1-1813459, Nov. 12-16, 2018, 15 pages.

(Continued)

*Primary Examiner* — Mewale A Ambaye
(74) *Attorney, Agent, or Firm* — Kilpatrick Townsend & Stockton LLP

(57) ABSTRACT

The present application relates to wireless devices and components including apparatus, systems, and methods for two-stage cell reselection in New Radio (NR) systems operating on unlicensed spectrum. In some embodiments, a user equipment may be perform a pre-check of a public land mobile network associated with a target cell prior to cell reselection.

17 Claims, 10 Drawing Sheets

(56) References Cited

U.S. PATENT DOCUMENTS

2022/0046750 A1\* 2/2022 Jeon .................... H04W 36/305
2022/0132587 A1\* 4/2022 Agiwal ............... H04W 36/035
2022/0210707 A1\* 6/2022 Lim ..................... H04W 48/20

OTHER PUBLICATIONS

Synchronization and acquisition of system information for FeMBMS, Ericsson, 3GPP TSG-RAN WG1 Meeting #86bis, R1-1609677, Oct. 10-14, 2016, 5 pages.
International Patent Application No. PCT/US2020/042057, International Search Report and Written Opinion, Mailed on Oct. 2, 2020, 15 pages.
3rd Generation Partnership Project; Technical Specification Group Radio Access Network; NR; User Equipment (UE) procedures in Idle mode and RRC Inactive state (Release 15), 3GPP TS 38.304 V15.4.0, Jun. 2020, 29 pages.
India Patent Application No. 202117059807, First Examination Report, Mailed Jul. 6, 2022, 6 pages.
The Chinese Application No. CN202080048408.X, Office Action, Mailed on Jan. 14, 2024, 9 pages.
The Korean Application No. KR10-2021-7042501, Office Action, Mailed on Nov. 30, 2023, 6 pages.

\* cited by examiner

CELL RESELECTION FOR NEW RADIO—UNLICENSED

RELATED APPLICATIONS

The present application is a 371 U.S. National Phase of PCT International Patent Application No. PCT/US2020/042057, filed Jul. 15, 2020, entitled CELL RESELECTION FOR NEW RADIO—UNLICENSED, which claims priority to U.S. Provisional Patent Application No. 62/874,796, filed Jul. 16, 2019, and entitled METHODS OF TWO-STEP CELL RE-SELECTION FOR NR-U. The disclosure of said applications are hereby incorporated by reference in their entireties.

FIELD

The present application relates to wireless communication systems including apparatuses, systems, and methods for cell reselection in New Radio-Unlicensed (NR-U) systems.

BACKGROUND

Third Generation Partnership Project (3GPP) Fifth Generation (5G) New Radio-Unlicensed (NR-U) targets efficient spectrum sharing between 5G New Radio (NR) and legacy wireless local area networks that operate in unlicensed bands. For NR-U, when a primary cell (PCell) is operating in an unlicensed band, a user equipment (UE) in an idle or inactive state may need to perform a cell reselection in the unlicensed band.

BRIEF DESCRIPTION OF DRAWINGS

A better understanding of the present subject matter can be obtained when the following detailed description of various embodiments is considered in conjunction with the following drawings.

Figure 1:
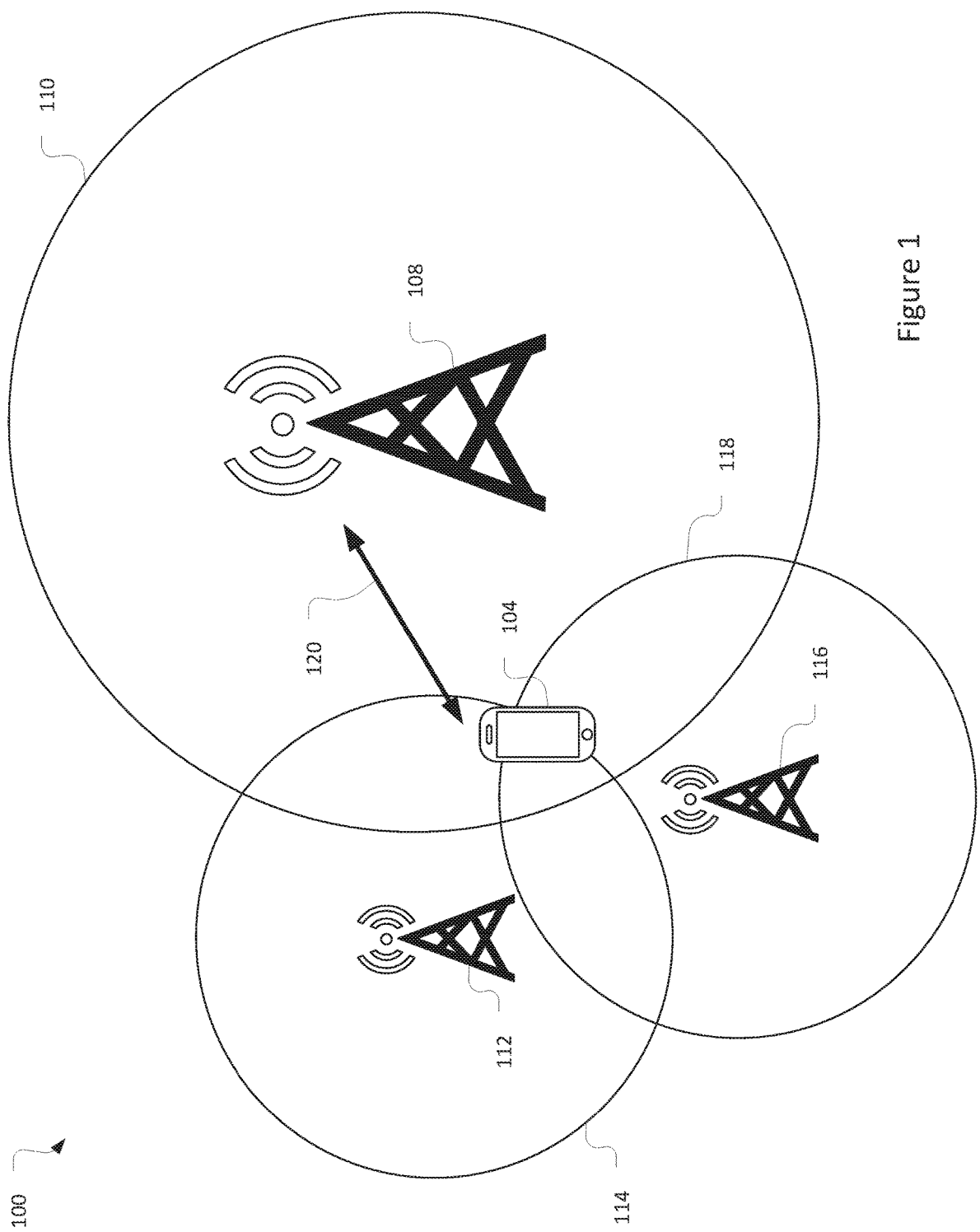
FIG. 1 illustrates network devices in accordance with some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure:

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

FIG. 1 illustrates a network environment 100 in accordance with some embodiments. The network environment 100 may include a UE 104 and a plurality of access nodes (ANs), for example, AN 108, AN 112, and AN 116.

Each AN may provide one more serving cells to provide cellular service to connected UEs. For example, AN 108 may provide serving cell 110, AN 112 may provide serving cell 114, and AN 116 may provide serving cell 118. While one serving cell is shown per AN, in various embodiments each AN may provide a plurality of serving cells including a primary cell (PCell) and one or more secondary cells (SCells). In some embodiments, the serving cells may have carrier frequencies located in an unlicensed portion of the spectrum and the network environment may operate, at least partially, in an NR-U system.

The UE 104 may include a radio resource control (RRC) state machine that performs operations related to a variety of RRC procedures including, for example, paging, RRC connection establishment, RRC connection reconfiguration, and RRC connection release. The RRC state machine may be implemented by protocol processing circuitry, see, for example, baseband circuitry 710 and 810 of FIGS. 7 and 8.

The RRC state machine may transition the UE into one of a number of RRC states (or "modes") including, for example, a connected state (RRC connected), an inactive state (RRC inactive), and an idle state (RRC idle). The UE 104 may start in RRC idle when it first camps on a 5G cell, for example, cell 110. This may be after the UE 104 has been switched on or after an inter-system cell reselection from a Long Term Evolution (LTE) cell.

To engage in active communications, the RRC state machine may transition the UE 104 from RRC idle to RRC connected by performing an RRC setup procedure to establish a logical connection 120, for example, an RRC connection 120, with the AN 108. In RRC connected, the UE 104 may be configured with at least one signaling radio bearer (SRB) for signaling (for example, control messages) with the AN 108; and one or more data radio bearers (DRBs) for data transmission.

When the UE is less actively engaged in network communications, the RRC state machine may transition the UE 104 from RRC connected to RRC inactive using an RRC release procedure. The RRC inactive state may allow the UE 104 to reduce power consumption as compared to RRC connected, but will still allow the UE 104 to quickly transition back to RRC connected to transfer application data or signaling messages.

While in RRC idle or RRC inactive, the RRC state machine may manage mobility by performing a cell reselection in the event signal metrics from the serving cell 110 fall below predetermined thresholds. In general, the UE 104 may measure signal metrics from a plurality of neighbor cells and select one or more of the neighbor cells as candidates for the reselection. Candidates of equal priority may be ranked based on signal metrics such as, for example, reference signal receive power (RSRP), reference signal received quality (RSRQ), signal-to-interference plus noise ratio (SINR), etc. The UE 104 may select one of the candidate cells, for example, cell 114 or 116, as a target cell for cell reselection. If one or more signal metrics from the target cell are over a predetermined threshold for a predetermined period of time, the UE 104 may complete the cell reselection.

For NR-U, when the PCell is operating in an unlicensed band, the cell reselection from RRC idle or RRC inactive may be applied by the UE 104 in the unlicensed band. In some instances, the neighbor cells operating in the unlicensed band may be from different operators belonging to different public land mobile networks (PLMNs). This may present a challenge for the UE 104 to have robust cell reselection in unlicensed bands. For example, if the UE 104 reselects to a cell that belongs to a different PLMN in which the UE 104 is not registered, the cell reselection would fail. Accordingly, various embodiments describe techniques to improve success rates for cell reselection in NR-U.

In some embodiments, the UE 104 may engage in a two-step (or "stage") cell reselection procedure for NR-U. As will be described in more detail below, the second stage, which is optional in some embodiments, may involve checking the PLMN associated with target cell before performing a reselection to the target cell. These embodiments may improve a success rate for UE-side cell re-selection in an unlicensed band, even in the presence of uncoordinated neighboring cells belonging to different PLMNs being in within that band.

Aspects of the embodiments described herein may be implemented through devices or components performing operation flows/algorithmic structures. FIGS. 2-6 illustrate some operation flows/algorithmic structures in accordance with some embodiments. Some or all of the details of FIGS. 2-6 may be performed by a UE, for example, UE 104 of FIG. 1 or UEs 701a or 701b of FIG. 7; components, for example, baseband circuitry 810/910 of FIGS. 8/9, or radio front end modules 815/915 of FIGS. 8/9; or processors 1012/1014 and memory/storage devices 1020 of FIG. 10.

Figure 2:
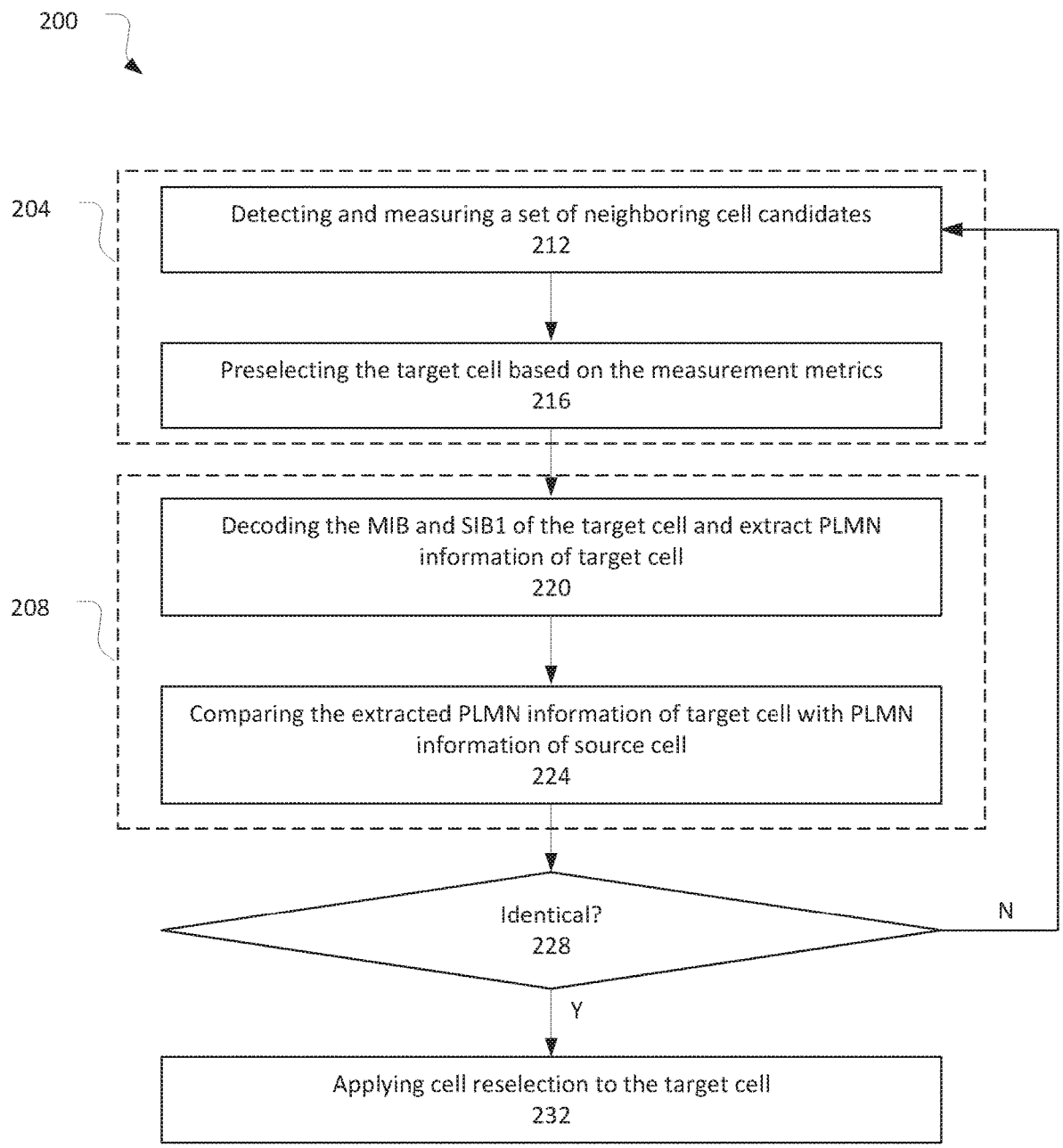
FIG. 2 an operation flow/algorithmic structure in accordance with some embodiments.

FIG. 2 illustrates an operation flow/algorithmic structure 200 for a two-stage cell reselection to improve cell reselection performance in accordance with some embodiments.

The operation flow/algorithmic structure 200 includes a first stage 204 and a second stage 208. Generally, the first stage 204 involves selection of a target cell, while the second stage 208 involves a pre-check of the PLMN information of the target cell.

In the first stage 204, at 208, the operation flow/algorithmic structure 200 may include detecting and measuring a set of neighboring cell candidates. In various embodiments, the UE may measure or otherwise obtain measurement quality metrics for assessing neighbor cells for cell reselection. These measurement quality metrics may include any combination of, for example, RSRP, RSRQ, SINR, etc.

In some embodiments, the RRC layer may direct lower layers to perform the detecting and measuring of the neighbor cell candidates. For example, a Layer 1 (L1) of the UE 104 may perform L1 measurements on synchronization signal/physical broadcast channel (SS/PBCH) blocks of neighbor cells Because reselection is to change a serving cell, the L1 measurements may be cell-level measurements, rather than beam-level measurements.

The cell-level measurements may be derived from one or more beam level measurements based on parameters broadcast within a system information block (SIB) 2 or SIB 4 of source cell for purposes of cell reselection. These parameters may include a number of SS-blocks to average, nrofSS-BlocksToAverage, which may range from 2-16, for example, and absolute threshold SS-blocks consolidation, absThreshSS-BlocksConsolidation, which may be a value range from 0-127 mapped onto an RSRP or RSRQ value. The cell level measurement may be defined as a linear average of up nrofSS-BlocksToAverage beams that have the strongest measurement results that exceed the absThreshSS-BlocksConsolidation threshold. If less than nrofSS-BlocksToAverage beams exceed the absThreshSS-BlocksConsolidation threshold, only the beams that exceed the threshold may be averaged. If no beams exceed the threshold, the cell level result may be set equal to the strongest beam level result.

In some embodiments, if the UE 104 is not configured with nrofSS-BlocksToAverage and absThreshSS-BlocksConsolidation parameters, the UE 104 may use the measurement from the strongest beam as the cell level measurement.

The first stage 204 may also include, at 216, preselecting the target cell based on the measurement metrics. In various embodiments, the preselection of the target cell may include a preliminary decision of determining that reselection from the current serving cell is to occur and further determining which of a number of candidate neighbor cells will be the target of the cell reselection process (hereinafter "target cell").

In some embodiments, the cell-level L1 measurements collected at 212 may be filtered at Layer 3 (L3) to detect one or more events related to comparing serving or target cell a measurements to various thresholds. These events may include an A2 event, which may be triggered when the serving cell becomes worse than a threshold; an A3 event, which may be triggered when a neighboring cell becomes better than a special cell (for example, the PCell of a master cell group or a secondary cell group) by an offset; or an A4 event, which may be triggered when a neighboring cell becomes better than a threshold.

The second stage 208 may include, at 220, decoding a master information block (MIB) and a system information block (SIB) 1 of the target cell and extracting PLMN information of the target cell. The target cell may broadcast system information using the MIB and a series of SIBs. Minimum system information (MSI) may be transmitted in the MIB and the SIB1, with the SIB1 specifically carrying remaining minimum system information (RMSI). The remaining SIBs, for example SIBs 2-9, may carry other system information (OSI).

The MIB may be transmitted using the BCCH logical channel, BCH transport channel, and PBCH physical channel. The SIB1 may be transmitted using the BCCH logical channel, the DL-SCH transport channel, and the PDSCH physical channel.

The UE 104 may acquire the MIB based on information provided by current serving cell (in, for example, a SIB4 transmission) regarding global synchronization channel numbers (GSCN) of neighbor cells. In embodiments in which the UE 104 does not have a current serving cell, the MIB may be acquired by scanning a set of GSCNs and discovering an SS/PBCH block, The MIB may be found directly on the PBCH without relying on any resource allocations on the PDCCH. The UE 104 may decode the MIB to discover information regarding a control resource set (CORESET) and search space used by the PDCCH when making a resource allocation for the SIB1 in the PDSCH. In this manner, the UE 104 may determine the signaling parameters (for example, time offset, frequency (for example, component carrier), transmission mode, etc.) for receiving the SIB1.

Upon receiving and decoding the SIB1, the UE 104 may extract the PLMN information from the decoded SIB1 bits. The PLMN information may be included in a cell access related information, cellAccessRelatedInfo, information element (IE) in the SIB1. The cellAccessRelatedInfo IE may include PLMN identities associated with the broadcasting cell. Each PLMN identity may be defined by its mobile country code (MCC) and mobile network code (MNC). Individual PLMN identities may be associated with a tracking area code (TAC), RAN area code (RANAC), cell identity, and flag to indicate whether or not the cell is reserved for operator use.

The UE 104 may compare the PLMN information from the SIB1 of the target cell to PLMN information associated with the serving cell. In some embodiments, the PLMN associated with the serving cell may have been previously acquired from a SIB1 transmitted by the serving gNB.

If the UE 104 determines, at 228, that a PLMN identity from the PLMN information of the target cell matches, for example, is identical to, a PLMN identity from the PLMN information of the source cell, the operation flow/algorithmic structure 200 may advance to applying a cell reselection to the target cell at 232. In some embodiments, this may include, among other things, the UE transmitting a random access channel to the gNB of the target cell to access the target cell and establish an RRC connection.

If the UE 104 determines, at 228, that a PLMN identity from the PLMN information of the target cell does not match, for example, is not identical to, a PLMN identity from the PLMN information of the source cell, the operation flow/algorithmic structure 200 may revert to the first stage 204, for example, detecting and measuring a set of neighboring cell candidates at 212. In some embodiments, if the measurement metrics obtained at 212 have not expired, the operation flow/algorithmic structure 200 may revert back to preselecting another target cell at 216 based on the previously obtained information.

Figure 3:
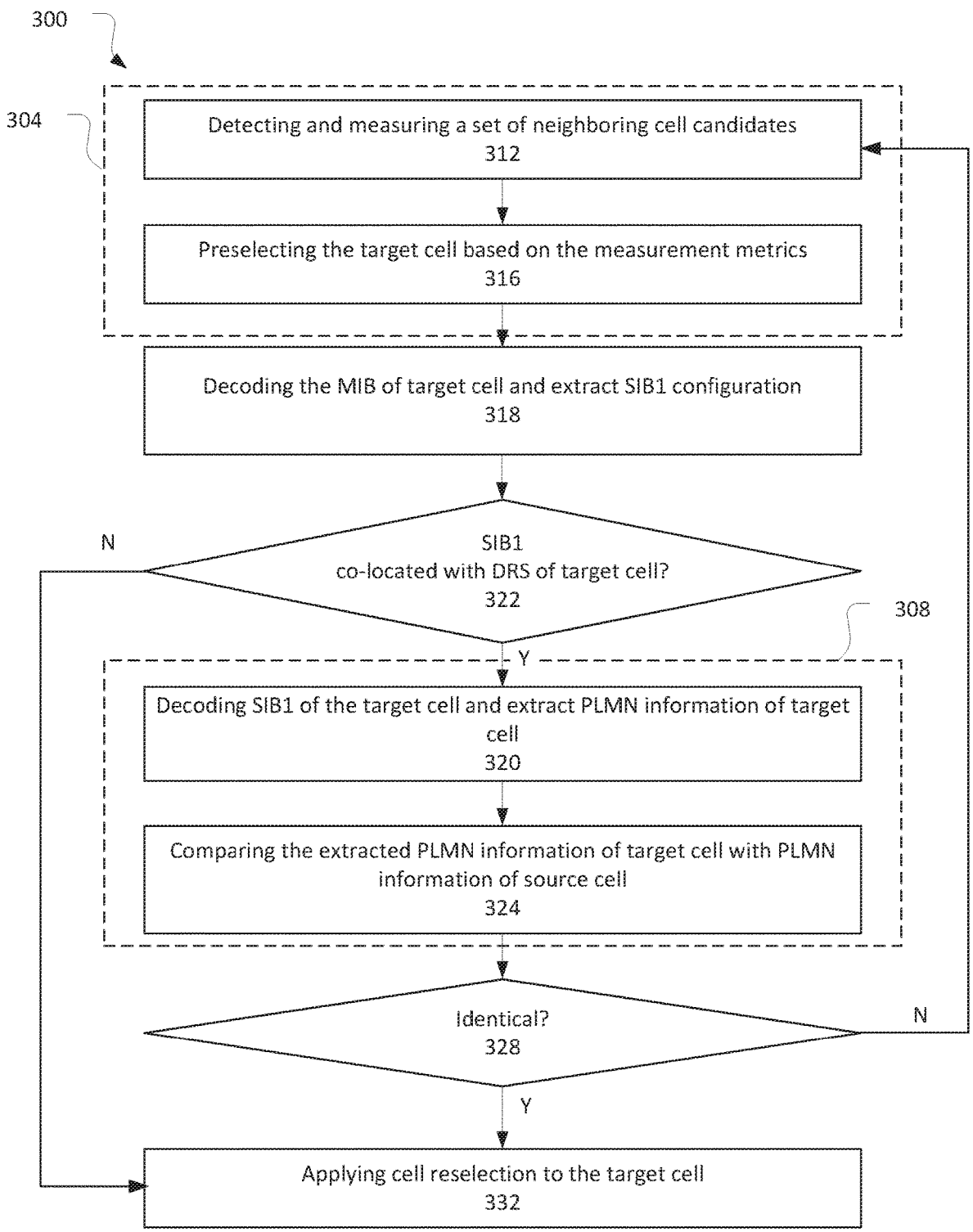
FIG. 3 illustrates an operation flow/algorithmic structure in accordance with some embodiments.

FIG. 3 illustrates an operation flow-algorithmic structure 300 for a one- or two-stage cell reselection to improve cell reselection in accordance with some embodiments.

The operation flow/algorithmic structure 300 may include a first stage 304 and a second stage 308. The second stage 308 may be an option that will be performed in some scenarios.

Similar to like-named operations of the first stage 204, the first stage 304 may include detecting and measuring a set of neighboring cell candidates at 312 and preselecting the target cell based on the measurement metrics at 316.

Following the first stage 304, the operation flow/algorithmic structure 300 may include, at 318, decoding the MIB of the target cell and extracting SIB1 configuration. As discussed above, the MIB may include information related to the SIB1 configuration including, for example, timing and other location information of the SIB1 transmissions.

At 322, the operation flow/algorithmic structure 322 may include determining whether the SIB1 is co-located with a DRS of the target cell. The DRS may correspond to the SS/PBCH blocks that the UE 104 processes for the purposes of, for example, acquiring the MIB, performing cell measurements and discovery, etc. If the SIB1 is co-located with the DRS, for example, in the DRS block or within a predefined time interval from the DRS block, the UE 104 may also proceed with SIB1 decoding quickly after having received the DRS from the associated candidate cell. Thus, if it is determined at 322, that the SIB1 is co-located with the DRS of the target cell, the operation flow/algorithmic structure 300 may proceed to the second stage 308.

The second stage 308 may include decoding the SIB1 of the target cell and extracting PLMN information of the target cell, at 320, and comparing the extracted PLMN information of the target cell with the PLMN information of the source cell at 324. Following extraction of the PLMN information, the UE may determine whether a PLMN ID associated with target cell is the same as PLMN ID associated with the source cell at 328 and either advance to applying the cell reselection at 332 or loop back to operations of the first stage 304. The operations at 320, 324, and 328 may be similar to respective operations described in 220, 224, and 228 of FIG. 2.

If the SIB1 is not co-located with the DRS of the target cell, for example, if the SIB1 allocation is further than a predefined timing threshold from the DRS block, it may be that the added assurance of the pre-selection PLMN check may not be worth the extra time needed to also decode the SIB1. Thus, in some embodiments, if it is determined, at 322, that the SIB1 is not co-located with the DRS of the target cell, the operation flow/algorithmic structure 300 may skip the second stage 308 to bypass the extra time needed to decode the SIB1 and proceed directly to applying the reselection at 332. In the event that the target cell is not associated with a compatible PLMN, the reselection may fail after the target cell does not respond to the UE's random access channel transmission. After which, the UE may attempt reselection with another candidate cell.

Figure 4:
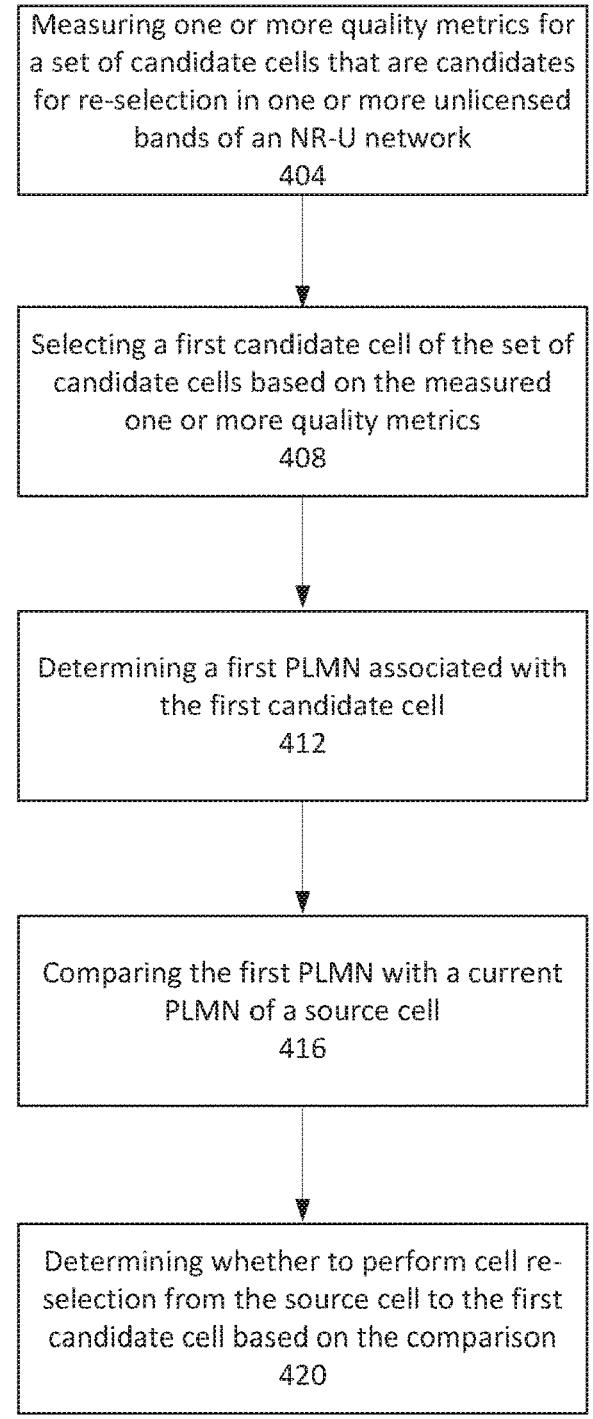
FIG. 4 illustrates an operation flow/algorithmic structure in accordance with some embodiments.

FIG. 4 illustrates an operation flow/algorithmic structure 400 for a two-stage cell reselection in accordance with some embodiments.

The operation flow/algorithmic structure 400 may include, at 404, measuring one or more quality metrics for a set of candidate cells that are candidates for cell reselection in one or more unlicensed bands of an NR-U network. The one or more quality metrics, as discussed above, may include, for example, one or more of an RSRP, an RSRQ, or an SINR.

The operation flow/algorithmic structure 400 may further include, at 408, selecting a first candidate cell of the set of candidate cells based on the measured one or more quality metrics. For example, the candidate cell with the quality metrics that indicate the highest quality among the set of candidate cells may be selected.

The operation flow/algorithmic structure 400 may further include, at 412, determining a first PLMN associated with the first candidate cell. The first PLMN may be determined by decoding SIB1 of the first candidate cell to extract PLMN information. In some embodiments, the UE may decode an MIB of the first candidate cell, and may decode the SIB based on information in the MIB as discussed above.

The operation flow/algorithmic structure 400 may further include, at 416, comparing the first PLMN a current PLMN of a source cell. In some embodiments, the target or source cell may be associated with more than one PLMN. For example, a cell may be associated with a plurality of PLMNs and the cell may broadcast a list of the IDs of the PLMNs in its SIB1 transmissions. In these embodiments, the comparing at 416 may include determining whether any PLMNs associated with the first candidate cell is also associated with the source cell.

The operation flow/algorithmic structure 400 may further include, at 420, determining whether to perform cell re-selection from the source cell to the first candidate cell based on the comparison at 416. For example, cell re-selection may be performed if the first PLMN is the same as the current PLMN (or if a PLMN associated with the first candidate cell is also associated with the source cell). If the first PLMN is different from the current PLMN (or if a PLMN associated with the first candidate cell is not also associated with the source cell), the cell re-selection to the first candidate cell may not be performed. Instead, the UE may select a second candidate cell from the set of candidate cells (for example, based on the measured one or more quality metrics and/or updated measurements of the one or more quality metrics). The UE 104 may then repeat the operations of 412, 416, and 420 for the second candidate cell.

Figure 5:
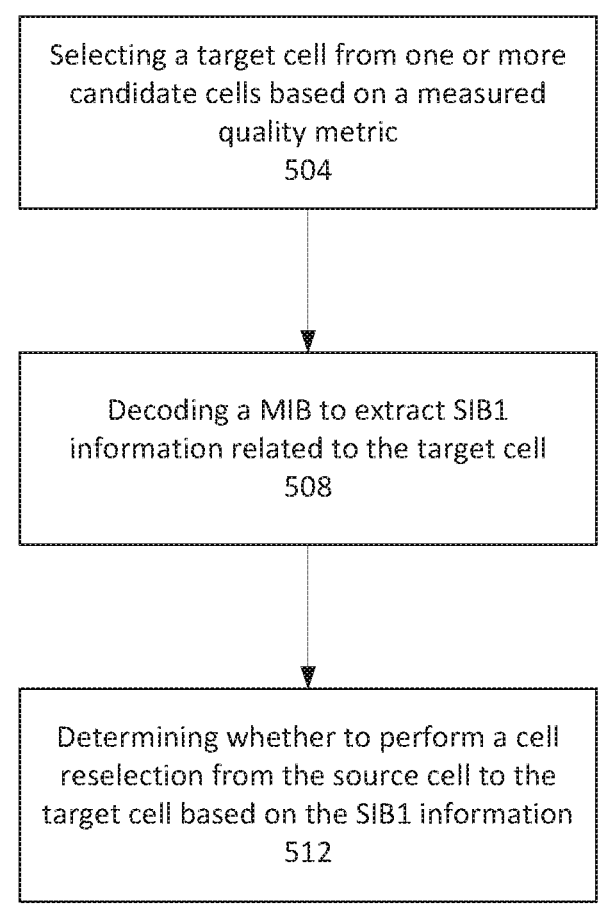
FIG. 5 illustrates an operation flow/algorithmic structure in accordance with some embodiments.

FIG. 5 illustrates an operation flow/algorithmic structure 500 in accordance with some embodiments.

In some embodiments, the operation flow/algorithmic structure 500 may be initiated upon an initial determination regarding the status of a current serving cell. For example, if a quality of the current serving cell, as measured by one or more quality metrics, falls below a predetermined threshold for a predetermined period of time, some or all the operation flow/algorithmic structure may be implemented by a UE.

Once initiated, the operation flow/algorithmic structure 500 may include, at 504, selecting a target cell from one or more candidate cells based on a measured quality metric. As discussed above, the UE may measure signals, for example, SS/PBCH signals, from various neighbor cells to determine quality metrics related to, or otherwise based on, RSRP, RSRP, SINR, etc. Based on these metrics, the UE may select one target cell from one or more candidate cells for cell reselection.

The operation flow/algorithmic structure 50 may further include, at 508, decoding a MIB to extract SIB1 information related to the target cell. The MIB, which may be transmitted in the PBCH of the target cell, may provide information related to configuration of the SIB (for example, the time/frequency resources on which the SIB1 is transmitted).

The operation flow/algorithmic structure 500 may further include, at 512, determining whether to perform a cell reselection from the source cell to the target call based on the SIB1 information.

In some embodiments, the SIB1 information may simply be location information (for example, time allocation information) of the SIB1. This location information may allow the UE to determine whether or not the SIB1 is co-located with a DRS (or SS/PBCH) of the target cell. To determine whether the SIB1 is co-located with the DRS, the UE may compare the SIB1 time allocation information with the DRS time allocation information. If a difference between the two time allocations is below a predefined threshold, the SIB1 may be considered to be co-located with the DRS. The UE may either pre-check PLMN information or proceed directly to cell reselection based on the determination of whether the SIB1 is co-located with the DRS. This may be similar to that described above with respect to operation 322 of FIG. 3.

In other embodiments, the SIB1 information upon which the UE bases determination at 512 may include additional/alternative information such as, but not limited to, PLMN information extracted from the SIB1 transmission itself. This may be the case if the UE performs a two-stage cell reselection procedure (as shown in FIG. 2, for example) or determines that the SIB1 is co-located with the DRS (or SS/PBCH) in the optional two-stage cell reselection procedure (as shown in FIG. 3, for example).

Figure 6:
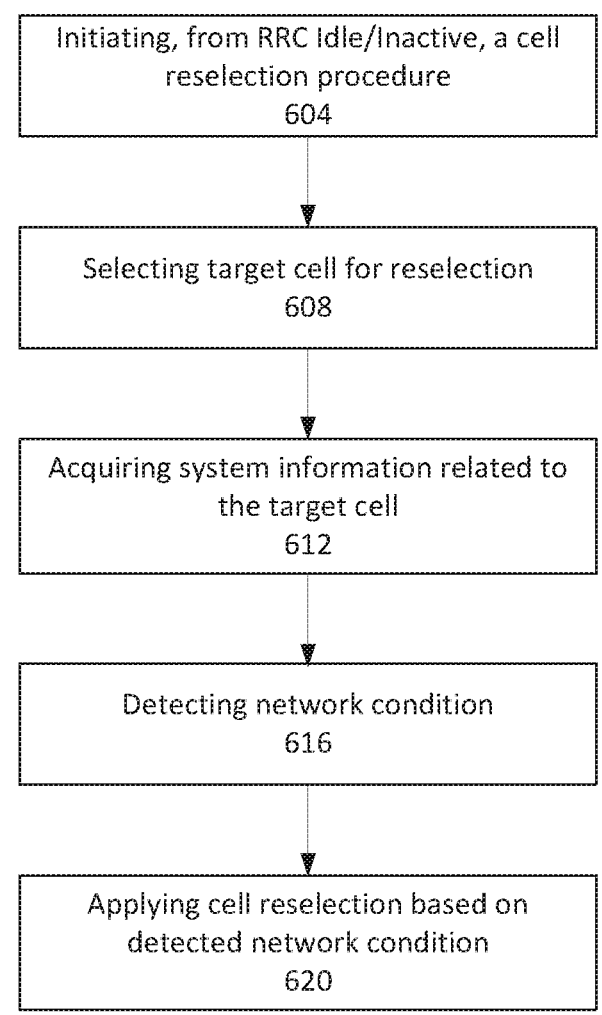
FIG. 6 illustrates an operation flow/algorithmic structure in accordance with some embodiments.

Thus, in some embodiments, if the UE detects a first condition (for example, SIB1 not co-located with DRS or both the target and source cells are associated with common PLMN) it may proceed to apply a reselection to the target cell. If the first condition relates to the co-location of the SIB1/DRS and is not in some cases, if the first condition is not present based on system information, that a first condition is (for example, th. The first condition may be t and may apply a reselection to a target cell FIG. 6 illustrates an operation flow/algorithmic structure 600 in accordance with some embodiments.

The operation flow/algorithmic structure 600 may include, at 604, initiating a cell reselection procedure. In some embodiments, the procedure may be initiated, from an RRC idle or RRC inactive state, when the UE detects that one or more quality metrics associated with a serving cell are below a predetermined threshold. In some embodiments, the metrics may also need to be below the threshold for a predetermined period of time for the UE to initiate the cell reselection procedure.

The operation flow/algorithmic structure 600 may further include, at 608, selecting a target cell for reselection. The selection of the target cell may be done in a manner similar to the operations described above with respect to 216 of FIG. 2, for example.

The operation flow/algorithmic structure 600 may further include, at 612, acquiring system information related to the target cell. In some embodiments, the system information acquired in this operation may include SIB1 time allocation information acquired from the MIB or PLMN information acquired from the SIB1.

The operation flow/algorithmic structure 600 may further include, at 616, detecting a network condition based on the acquired system information. The network condition detected at 616 may be the non-co-location of the SIB1 and a DRS of the target cell. In other embodiments, the network condition detected at 616 may be that both the source cell and the target cell are associated with a common PLMN.

This may be detected by comparing target cell PLMN information (acquired from the SIB1) with source cell PLMN information.

The operation flow/algorithmic structure 600 may further include, at 620, applying the cell reselection based on the detected network condition. Application of the cell reselection at 332 may be similar to operations described above with respect to 332 of FIG. 3.

Figure 7:
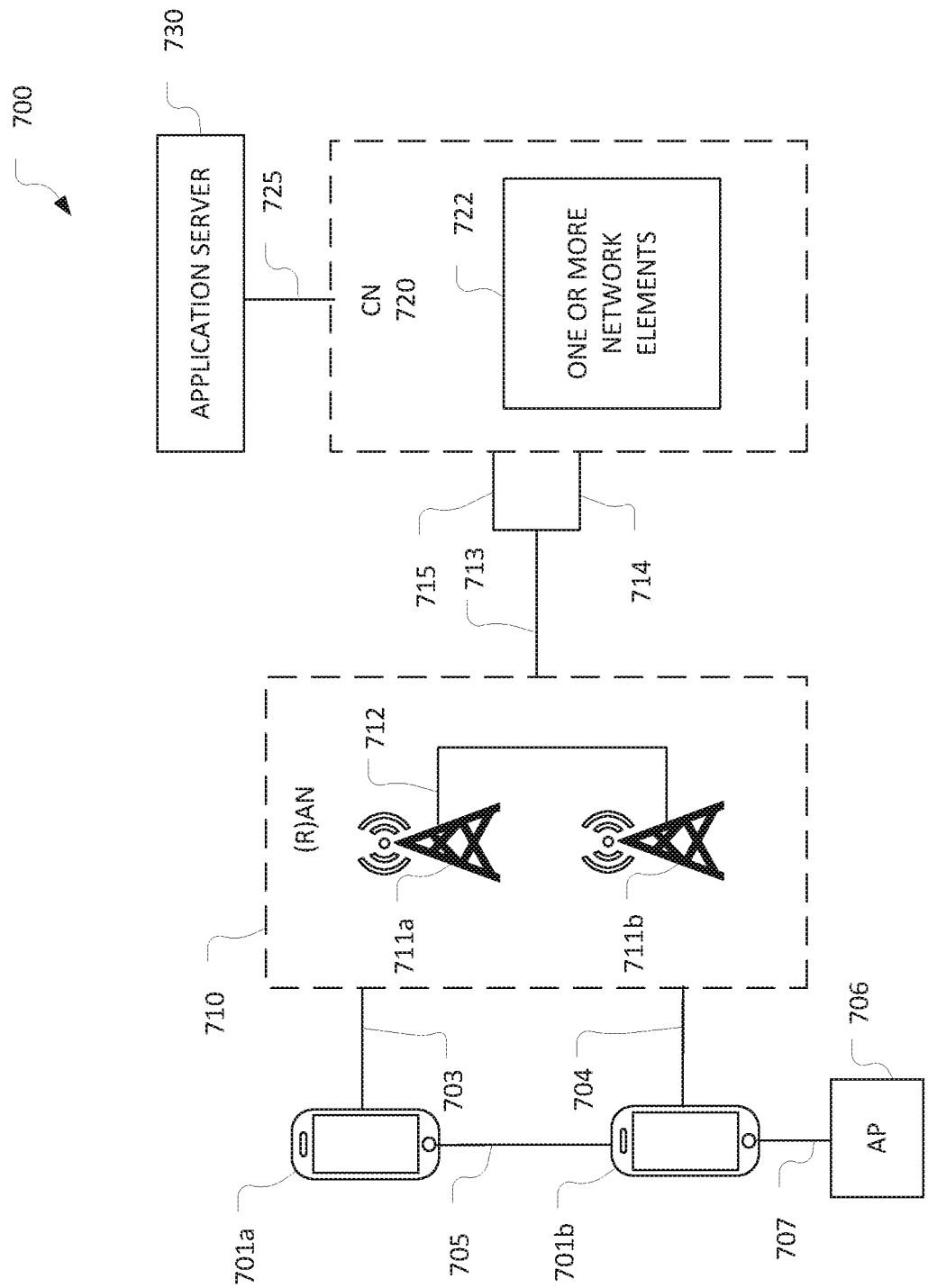
FIG. 7 illustrates an example architecture of a system in accordance with some embodiments.

Turning now to FIG. 7, an example architecture of a system 700 of a network is illustrated, in accordance with various embodiments. The following description is provided for an example system 700 that operates in conjunction with 5G or NR system standards as provided by 3GPP technical specifications, for example. However, the example embodiments are not limited in this regard, and the described embodiments may apply to other networks that benefit from the principles described herein, such as future 3GPP systems (e.g., Sixth Generation (6G)) systems or other wireless networks.

As shown by FIG. 7, the system 700 includes UE 701a and UE 701b (collectively referred to as "UEs 701"). In this example, UEs 701 are illustrated as smartphones (e.g., handheld touchscreen mobile computing devices connectable to one or more cellular networks) but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices. M2M, IoT devices, and/or the like.

In some embodiments, any of the UEs 701 may be Internet of Things (IoT) UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 701 may be configured to connect, for example, communicatively couple, with a Radio Access Network (RAN) 710. In embodiments, the RAN 710 may be an NG RAN or a 5G RAN. As used herein, the term "NG RAN" or the like may refer to a RAN 710 that operates in an NR or 5G system 700. The UEs 701 utilize connections (or channels) 703 and 704, respectively, each of which comprises a physical communications interface or layer.

In this example, the connections 703 and 704 are illustrated as an air interface to enable communicative coupling, and can be consistent with cellular communications protocols, such as a 3GPP 5G/NR protocol or any of the other communications protocols discussed herein. In embodiments, the UEs 701 may directly exchange communication data via a ProSe interface 705. The ProSe interface 705 may alternatively be referred to as a sidelink (SL) interface 705.

The UE 701b is shown to be configured to access an access point (AP) 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation.

The RAN 710 can include one or more access nodes (ANs) or RAN nodes 711a and 711b (collectively referred to as "RAN nodes 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In vehicle-to-everything (V2X) scenarios one or more of the RAN nodes 711 may be or act as a road-side unit (RSU). An RSU may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplex (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band").

To operate in the unlicensed spectrum, for example, in NR-U systems, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

As discussed above, LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied).

The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The RAN nodes 711 may be configured to communicate with one another via interface 712. The interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, network function virtualization (NFV) may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the CN 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the SI control plane (NG-C) interface 715, which is a signaling interface between the RAN nodes 711 and AMFs.

Figure 8:
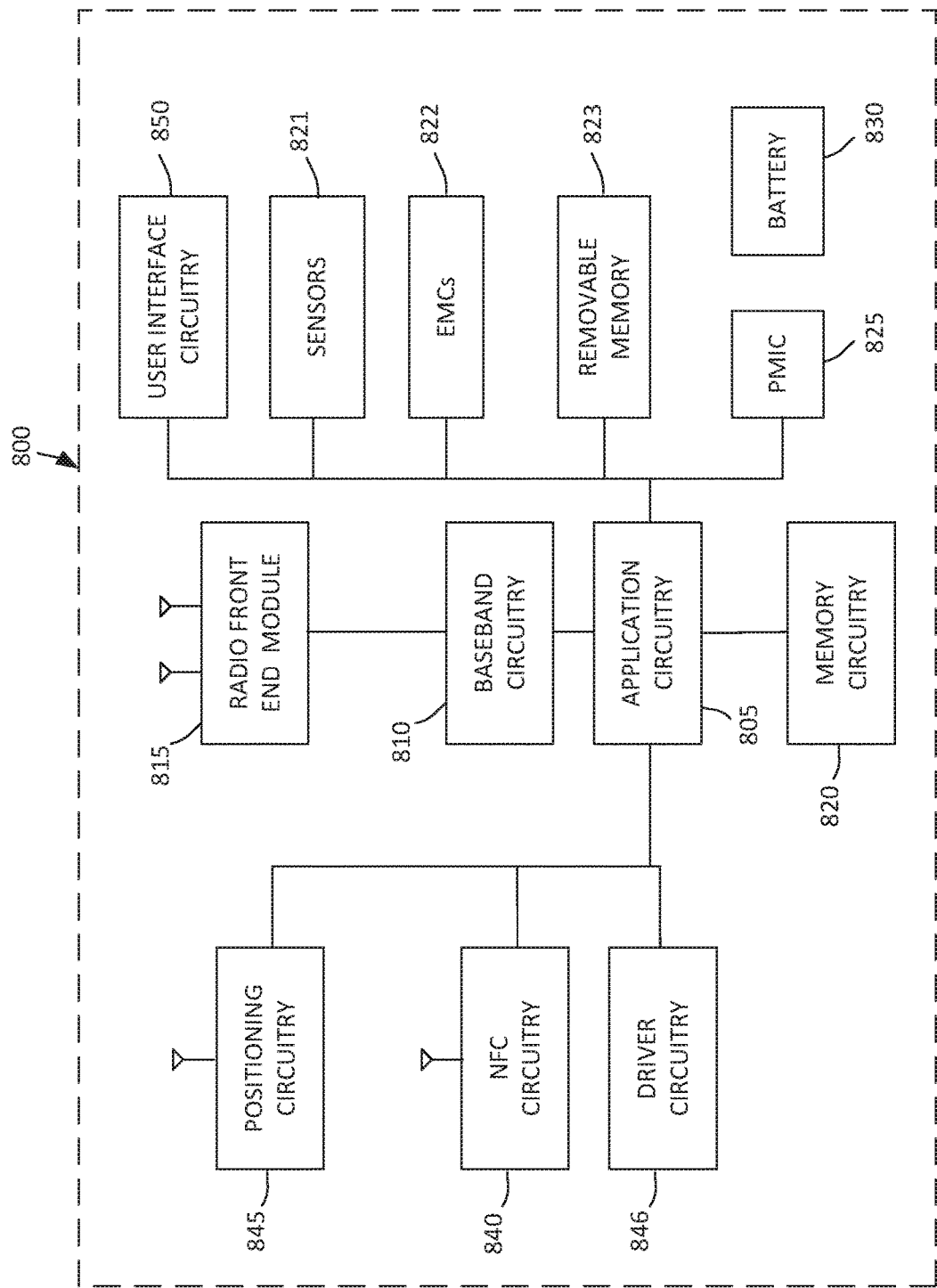
FIG. 8 illustrates an example of a platform (or "device") in accordance with some embodiments.

FIG. 8 illustrates an example of a platform 800 (or "device 800") in accordance with various embodiments. In embodiments, the computer platform 800 may be suitable for use as UEs 701 and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces, universal programmable serial interface module, RTC, timer-counters including interval and watchdog timers, general purpose I/O, memory card controllers such as SD MMC or similar, USB interfaces, MIPI® interfaces, and JTAG test access ports. The processors (or cores) of the application circuitry 805 may be coupled with or may include memory/storage elements and may be configured to execute instructions stored in the memory/storage to enable various applications or operating systems to run on the system Processors of the application circuitry XS105/XS205 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 804 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

In some implementations, the memory/storage elements may be on-chip memory circuitry, which may include any suitable volatile and/or non-volatile memory, such as dynamic random access memory DRAM, SRAM, EPROM, EEPROM, Flash memory, solid-state memory, and/or any other type of memory device technology, such as those discussed herein.

The processor(s) of application circuitry 805 may include, for example, one or more processor cores, one or more application processors, one or more graphic processing units (GPUs), as one or more reduced instruction set computer (RISC) processors, one or more Arm processors, one or more complex instruction set computer (CISC) processors, one or more DSPs, one or more field-programmable gate arrays (FPGAs), one or more PLDs, one or more ASICs, one or more microprocessors or controllers, a multithreaded processor, an ultra-low voltage processor, an embedded processor, some other known processing element, or any suitable combination thereof, In some embodiments, the application circuitry 805 may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 805 may also be one or more of Advanced Micro Devices (AMD) Ryzen®, processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an Arm-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more FPDs such as FPGAs and the like; PLDs such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells such as EPROM, EEPROM, flash memory, static memory (e.g., SRAM, anti-fuses, etc.)) used to store logic blocks, logic fabric, data, etc. in LUTs and the like.

The baseband circuitry 810 may be implemented, for example, as a solder-down substrate including one or more integrated circuits, a single packaged integrated circuit soldered to a main circuit board or a multi-chip module containing two or more integrated circuits.

The RFEM 815, which may also be referred to as "radio front end circuitry," may comprise a mmWave RFEM and one or more sub-mmWave RFICs. In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including RAM, DRAM, and/or SDRAM, and NVM including high-speed electrically erasable memory (commonly referred to as Flash memory), PRAM, MRAM, etc. The memory circuitry 820 may be developed in accordance with a JEDEC LPDDR-based design, such as LPDDR2, LPDDR3, LPDDR4, or the like. Memory circuitry 820 may be implemented as one or more of solder down packaged integrated circuits, single die package (SDP), DDP or Q17P, socketed memory modules, DIMMs including microDIMMs or Mini-DIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a SSDD, HDD, a micro HDD, resistance change memories, phase change memories, holographic memories, or chemical memories, among others. For example, the computer platform 800 may incorporate the XPOINT memories from Intel® and Micron®.

Removable memory circuitry 823 may include devices, circuitry, enclosure/housings, ports or receptacles, etc. used to couple portable data storage devices with the platform 800. These portable data storage devices may be used for mass storage purposes, and may include, for example, flash memory cards (e.g., SD cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signaling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 740, or initiate data transfer between the NFC circuitry 740 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform

800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The PMIC 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 701.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as DRX after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a BMS or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 9:
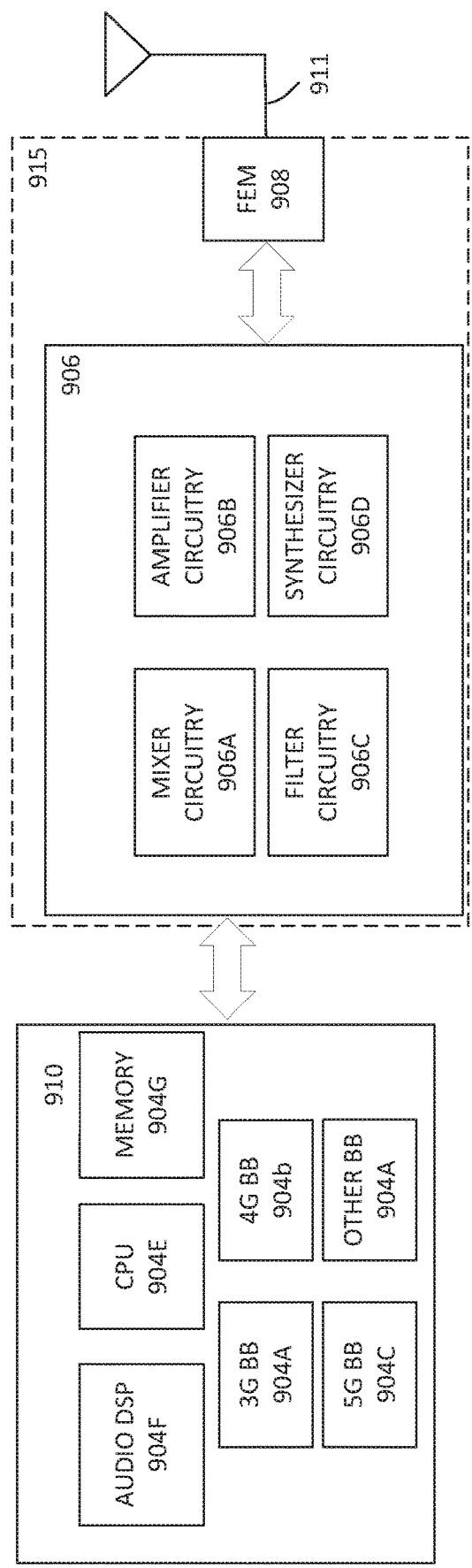
FIG. 9 illustrates example components of a baseband circuitry and radio frequency front end modules in accordance with some embodiments.

FIG. 9 illustrates example components of baseband circuitry 910 and radio front end modules (RFEM) 915 in accordance with various embodiments. The baseband circuitry 910 corresponds to the baseband circuitry 810 of FIG. 8. The RFEM 915 corresponds to the RFEM 815 of FIG. 8. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 805 of FIG. 8 for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a CPU 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio DSPs 904F. The audio DSP(s) 904F include elements for compression/decompression and echo cancellation and may include other suitable processing elements in other embodiments.

In some embodiments, each of the processors 904A-904F include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 805 of FIG. 8); an RF circuitry interface to send/receive data to/from RF circuitry 906; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (for example, memory 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry may be implemented together as individual SoCs mounted to a same circuit board (for example, a "multi-chip package").

In some embodiments, the baseband circuitry 910 may provide for communication compatible with one or more radio technologies. For example, in some embodiments, the baseband circuitry 910 may support communication with an NG-RAN, E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network, RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RE circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry XS105/XS205 depending on the desired output frequency. In some embodiments, a divider control input (e.g., N) may be determined from a look-up table based on a channel indicated by the application circuitry.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Figure 10:
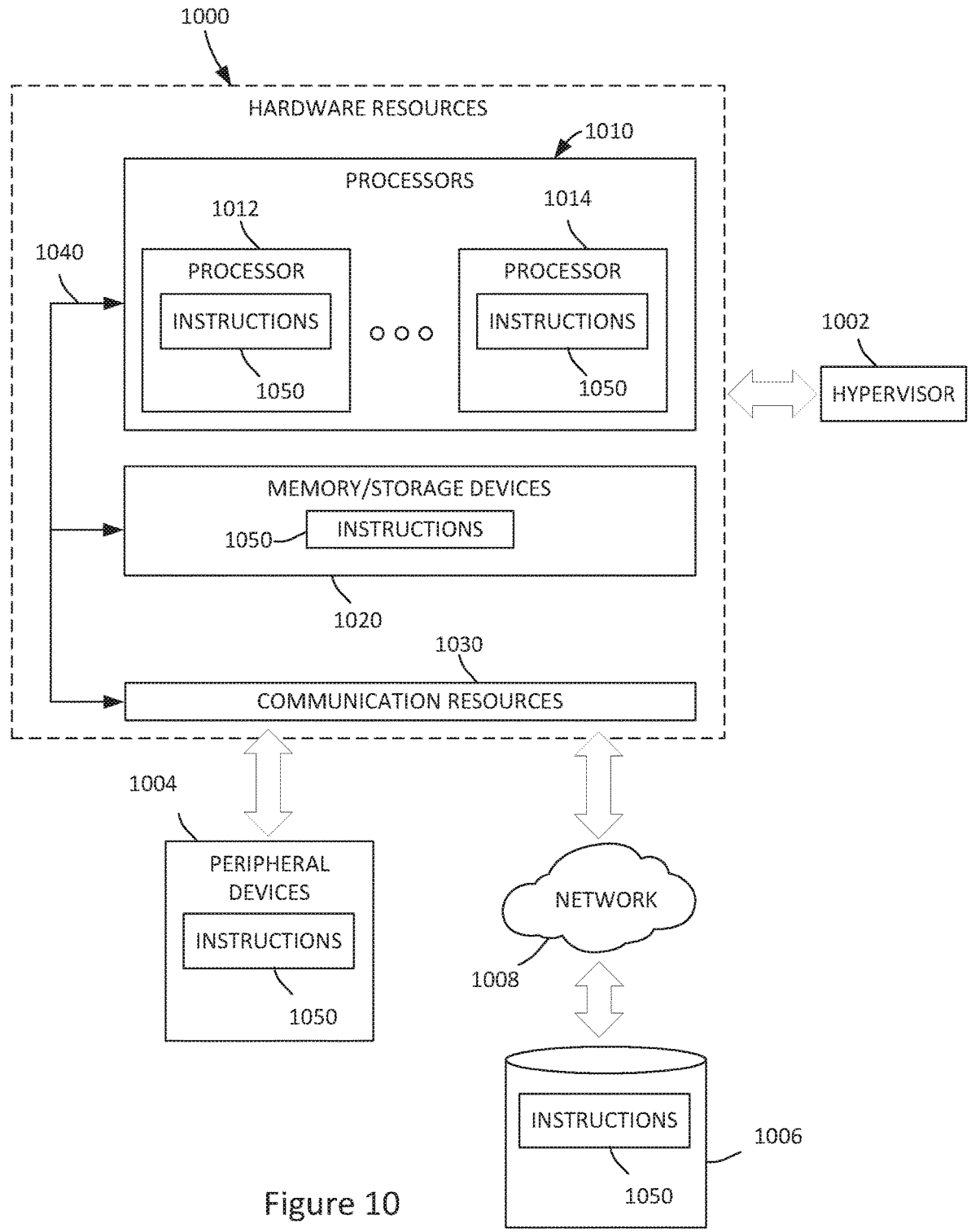
FIG. 10 is a block diagram illustrating components able to read instructions from a machine-readable or computer-readable medium and perform any one or more of the methodologies discussed herein in accordance with some embodiments.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a CPU, a RISC processor, a CISC processor, a GPU, a DSP such as a baseband processor, an ASIC, an FPGA, a RFIC, another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as DRAM. SRAM, EPROM, EEPROM, Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: storing one or more PLMN IDs associated with a source cell; selecting a candidate cell based on a measured quality metric; decoding a SIB1 message to determine at least one PLMN ID associated with the candidate cell; comparing the at least one PLMN ID with the one or more PLMN IDs; and determining whether to perform cell reselection from the source cell to the candidate cell based on the comparison of the at least one PLMN ID with the one or more PLMN IDs.

Example 2 includes the method of example 1 or some other example herein, further comprising: determining, based on comparison of the at least one PLMN ID with the one or more PLMN IDs, a first PLMN ID is included in both the at least one PLMN ID and the one or more PLMN IDs; and determining, based on determination that the first PLMN ID is included in both the at least one PLMN ID and the one or more PLMN IDs, to perform the cell reselection from the source cell to the candidate cell.

Example 3 includes the method of example 1 or some other example herein, further comprising: performing the cell reselection based on the said determination to perform the cell reselection.

Example 4 includes the method of example 1 or some other example herein, further comprising: determining, based on comparison of the at least one PLMN ID with the one or more PLMN IDs, that no PLMN IDs are in both the at least one PLMN ID and the one or more PLMN IDs; and determining, based on determination that the no PLMN IDs are in both the at least one PLMN ID and the one or more PLMN IDs, not to perform the cell reselection from the source cell to the candidate cell.

Example 5 includes the method of example 4 or some other example herein, wherein the candidate cell is a first candidate cell, the measured quality metric is a first measured quality metric, and, based on determination not to perform, the method further comprises: selecting, based on a second measured quality metric, a second candidate cell from a set of candidate cells that also includes the first candidate cell; determining one or more PLMN IDs associated with the second candidate cell; comparing the at least one PLMN ID with the one or more PLMN IDs associated with the second candidate cell; and determining whether to perform cell re-selection to the second candidate cell based on the comparison of the at least one PLMN ID with the one or more PLMN IDs associated with the second candidate cell.

Example 6 includes the method of example 1 or some other example herein, further comprising: decoding a MIB to determine SIB1 information; and decoding the SIB1 based on the SIB1 information.

Example 7 includes the method of example 6 or some other example herein, further comprising: determining that the SIB1 is co-located with a DRS of the candidate cell; and decoding the SIB1 based on determination that the SIB1 is co-located with the DRS.

Example 8 includes the method of example 7 or some other example herein, wherein determining that the SIB1 is co-located with the DRS comprises determining a time allocation of the SIB1 is within a predefined threshold from a time allocation of the DRS.

Example 9 may include a method of operating a UE, the method comprising: selecting a target cell from one or more candidate cells based on a measured quality metric; decoding a MIB to extract SIB1 information related to the target cell; and determining whether to perform a cell reselection from a source cell to the target cell based on the SIB1 information.

Example 10 may include the method of example 9 or some other example herein, further comprising: determining, based on the SIB1 information, whether a SIB1 of the target cell is co-located with a DRS of the candidate cell; and determining, based on determination of whether the SIB1 is co-located with the DRS, whether to check PLMN information within the SIB1 prior to performing a cell reselection.

Example 11 may include the method of example 10 or some other example herein, further comprising: determining, based on the SIB1 information, that the SIB1 is not co-located with the DRS; and performing, based on said determination that the SIB1 is not co-located with the DRS, a cell reselection from the source cell to the target cell without a prior check of the PLMN information.

Example 12 may include the method of example 10 or some other example herein, further comprising: determining, based on the SIB1 information, that the SIB1 is co-located with the DRS; checking, based on said determination that the SIB1 is co-located with the DRS, the PLMN information in the SIB1; and determining whether to perform the cell reselection from the source cell to the target cell based on the check of the PLMN information.

Example 13 may include the method of example 12 or some other example herein, wherein checking the PLMN information comprises: decoding the SIB1 to extract at least one PLMN ID associated with the target cell; and determining whether any PLMN IDs of the at least one PLMN ID matches a PLMN ID associated with the source cell.

Example 14 may include the method of example 13 or some other example herein, further comprising: determining, based on a determination that no PLMN IDs of the at least one PLMN ID matches a PLMN ID associated with the source cell, not to perform a cell reselection from the source cell to the target cell.

Example 15 may include the method of example 13 or some other example herein, further comprising: determining, based on a determination that a first PLMN ID of the at least one PLMN ID matches a PLMN ID associated with the source cell, to perform a cell reselection from the source cell to the target cell.

Example 16 may include the method of example 10 or some other example herein, further comprising: determining that the SIB1 is co-located with the DRS if the SIB1 is within a predefined timing threshold from the DRS.

Example 17 may include the method of example 9 or some other example herein, wherein the measured quality metric includes a reference signal receive power (RSRP) metric, a reference signal receive quality (RSRQ) metric, or a signal-to-interference plus noise ratio (SINR) metric.

Example 18 may include a method of performing a cell reselection, the method comprising: initiating, from a radio resource control "RRC" idle or inactive state, a cell reselection procedure based on a detection of one or more quality metrics associated with a serving cell being below a predetermined threshold; selecting a target cell for reselection; acquiring system information related to the target cell; detecting, based on the system information, a network condition, wherein the network condition is that: a SIB 1 of the target cell is not co-located with a DRS of the target cell; or both the target cell and the source cell are associated with a common PLMN; and applying a cell reselection based on the detection of the network condition.

Example 19 may include the method of example 18 or some other example herein, wherein acquiring the system information comprises: decoding a MIB to obtain timing allocation information related to a SIB1.

Example 20 may include the method of example 18 or some other example herein, wherein acquiring the system information comprises: decoding a SIB 1 to determine PLMN information for the target cell.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor comprising:
processing circuitry to:
   select a candidate cell based on a measured quality metric;
   decode a master information block (MIB) to determine system information broadcast 1 (SIB1) information;
   determine that an SIB1 is co-located with a discovery reference signal (DRS) of the candidate cell;
   decode, based on the SIB1 information and determination that the SIB1 is co-located with the DRS, the SIB1 to determine at least one public land mobile network (PLMN) identity (ID) associated with the candidate cell;
   compare the at least one PLMN ID with one or more PLMN IDs associated with a source cell; and
   determine whether to perform cell reselection from the source cell to the candidate cell based on the comparison of the at least one PLMN ID with the one or more PLMN IDs; and
interface circuitry coupled with the processing circuitry, the interface circuitry to communicatively couple the processing circuitry with a component of an apparatus.

2. The baseband processor of claim 1, wherein the processing circuitry is further to: determine, based on comparison of the at least one PLMN ID with the one or more PLMN IDs, a first PLMN ID is included in both the at least one PLMN ID and the one or more PLMN IDs; and determine, based on determination that the first PLMN ID is included in both the at least one PLMN ID and the one or more PLMN IDs, to perform the cell reselection from the source cell to the candidate cell.

3. The baseband processor of claim 1, wherein the processing circuitry is further to: perform the cell reselection based on the determination to perform the cell reselection.

4. The baseband processor of claim 1, wherein the processing circuitry is further to: determine, based on comparison of the at least one PLMN ID with the one or more PLMN IDs, that no PLMN IDs are in both the at least one PLMN ID and the one or more PLMN IDs; and determine, based on determination that the no PLMN IDs are in both the at least one PLMN ID and the one or more PLMN IDs, not to perform the cell reselection from the source cell to the candidate cell.

5. The baseband processor of claim 4, wherein the candidate cell is a first candidate cell, the measured quality metric is a first measured quality metric, and, based on determination not to perform, the processing circuitry is further to:
  select, based on a second measured quality metric, a second candidate cell from a set of candidate cells that also includes the first candidate cell;
  determine one or more PLMN IDs associated with the second candidate cell;
  compare the at least one PLMN ID with the one or more PLMN IDs associated with the second candidate cell; and
  determine whether to perform cell re-selection to the second candidate cell based on the comparison of the at least one PLMN ID with the one or more PLMN IDs associated with the second candidate cell.

6. The baseband processor of claim 1, wherein, to determine that the SIB1 is co-located with the DRS, a user equipment (UE) is to determine a time allocation of the SIB1 is within a predefined threshold from a time allocation of the DRS.

7. One or more non-transitory storage-media having instructions that, when executed, cause processing circuitry to:
  select a target cell from one or more candidate cells based on a measured quality metric;
  decode a master information block (MIB) to extract system information broadcast 1 (SIB1) information related to the target cell; and
  determine whether to perform a cell reselection from a source cell to the target cell based on the SIB1 information;
  determine, based on the SIB1 information, whether a SIB1 of the target cell is co-located with a discovery reference signal (DRS) of the candidate cell; and
  determine, based on determination of whether the SIB1 is co-located with the DRS, whether to check public land mobile network (PLMN) information within the SIB1 prior to performing the cell reselection.

8. The one or more non-transitory storage-media of claim 7, wherein the instructions, when executed, further cause the processing circuitry to:
  determine, based on the SIB1 information, that the SIB1 is not co-located with the DRS; and
  perform, based on said determination that the SIB1 is not co-located with the DRS, the cell reselection from the source cell to the target cell without a prior check of the PLMN information.

9. The one or more non-transitory storage-media of claim 7, wherein the instructions, when executed, further cause the processing circuitry to:
  determine, based on the SIB1 information, that the SIB1 is co-located with the DRS;
  check, based on said determination that the SIB1 is co-located with the DRS, the PLMN information in the SIB1; and
  determine whether to perform the cell reselection from the source cell to the target cell based on the check of the PLMN information.

10. The one or more non-transitory storage-media of claim 9, wherein to check the PLMN information, the processing circuitry is to:
  decode the SIB1 to extract at least one PLMN identity (ID) associated with the target cell; and
  determine whether any PLMN IDs of the at least one PLMN ID matches a PLMN ID associated with the source cell.

11. The one or more non-transitory storage-media of claim 10, wherein the instructions, when executed, further cause the processing circuitry to:
  determine, based on a determination that no PLMN IDs of the at least one PLMN ID matches a PLMN ID associated with the source cell, not to perform the cell reselection from the source cell to the target cell.

12. The one or more non-transitory storage-media of claim 10, wherein the instructions, when executed, further cause the processing circuitry to:
  determine, based on a determination that a first PLMN ID of the at least one PLMN ID matches a PLMN ID associated with the source cell, to perform the cell reselection from the source cell to the target cell.

13. The one or more non-transitory storage-media of claim 7, wherein the instructions, when executed, further cause the processing circuitry to:
  determine that the SIB1 is co-located with the DRS if the SIB1 is within a predefined timing threshold from the DRS.

14. The one or more non-transitory storage-media of claim 7, wherein the measured quality metric includes a reference signal receive power (RSRP) metric, a reference signal receive quality (RSRQ) metric, or a signal-to-interference plus noise ratio (SINR) metric.

15. A method comprising:
  initiating, from a radio resource control (RRC) idle or inactive state, a cell reselection procedure based on a detection of one or more quality metrics associated with a serving cell being below a predetermined threshold;
  selecting a target cell for reselection;
  acquiring system information related to the target cell;
  detecting, based on the system information, a network condition, wherein the network condition is that: a system information block 1 (SIB1) of the target cell is not co-located with a discovery reference signal (DRS) of the target cell; and
  applying a cell reselection without a prior check of public land mobile network (PLMN) information based on the detection of the network condition.

16. The method of claim 15, wherein acquiring the system information comprises:
  decoding a master information block (MIB) to obtain timing allocation information related to the SIB1.

17. The method of claim 15, wherein acquiring the system information comprises:
  decoding the SIB1 to determine PLMN information for the target cell.

* * * * *